(12) United States Patent
Goncalves et al.

(10) Patent No.: US 12,409,822 B2
(45) Date of Patent: Sep. 9, 2025

(54) VEHICLE BRAKING SYSTEM COMPRISING A SERVICE BRAKE INDICATOR DEVICE AND VEHICLE PROVIDED WITH SUCH A SYSTEM

(71) Applicant: Wabtec Hauts-de-France, Amiens (FR)

(72) Inventors: Claudino Goncalves, Ribeaucourt (FR); Jérémie Sales, Amiens (FR)

(73) Assignee: Wabtec Hauts-de-France, Amiens (FR)

( * ) Notice: Subject to any disclaimer, the term of this patent is extended or adjusted under 35 U.S.C. 154(b) by 1005 days.

(21) Appl. No.: 17/436,394

(22) PCT Filed: Mar. 2, 2020

(86) PCT No.: PCT/FR2020/050415
§ 371 (c)(1),
(2) Date: Sep. 3, 2021

(87) PCT Pub. No.: WO2020/178517
PCT Pub. Date: Sep. 10, 2020

(65) Prior Publication Data
US 2022/0144233 A1 May 12, 2022

(30) Foreign Application Priority Data
Mar. 4, 2019 (FR) ..................... 1902198

(51) Int. Cl.
*B60T 13/36* (2006.01)
*B60T 13/66* (2006.01)
(Continued)

(52) U.S. Cl.
CPC .......... *B60T 13/365* (2013.01); *B60T 13/665* (2013.01); *B60T 17/16* (2013.01); *B60T 17/225* (2013.01);
(Continued)

(58) Field of Classification Search
CPC ...... B60T 13/365; B60T 13/665; B60T 17/16; B60T 17/225; B60T 17/228;
(Continued)

(56) References Cited

U.S. PATENT DOCUMENTS 10,780,873 B2 * 9/2020 Goncalves ............ B60T 17/228
10,850,720 B2 * 12/2020 Crochu ................... B60T 17/16

FOREIGN PATENT DOCUMENTS

EP 2826683 A1 1/2015
EP 2826684 A1 1/2015
(Continued)

OTHER PUBLICATIONS

International Search Report and Written Opinion mailed Jun. 29, 2020 for corresponding Application No. PCT/FR2020/050415 (8 pages).
(Continued)

*Primary Examiner* — Melody M Burch
(74) *Attorney, Agent, or Firm* — K&L Gates LLP (57) ABSTRACT

A vehicle braking system includes brakes, a body, a braking linkage, a service brake comprising a braking piston movable relative to the body to act on the braking linkage and delimiting a service brake pressure chamber to place the braking piston in a service braking position. A parking brake acts on the braking piston and has a working configuration and a resting configuration. The parking brake includes a blocking device movable relative to the body to act on the braking piston and having a first position and a second position in which the blocking device is configured to immobilize the braking piston in a service braking position. A control device is movable relative to the body and has a locking position to hold the blocking device in the second
(Continued)

position. A service brake indicator device receives information representing supply and/or venting of the service brake pressure chamber.

10 Claims, 6 Drawing Sheets

(51) Int. Cl.
    *B60T 17/16*     (2006.01)
    *B60T 17/22*     (2006.01)
    *B61H 13/04*     (2006.01)
    *F16D 55/224*     (2006.01)
    *F16D 65/18*     (2006.01)
    *F16D 65/44*     (2006.01)
    *F16D 65/56*     (2006.01)
    *F16D 125/24*     (2012.01)

(52) U.S. Cl.
    CPC ............ *B60T 17/228* (2013.01); *B61H 13/04* (2013.01); *F16D 55/2245* (2013.01); *F16D 65/183* (2013.01); *F16D 65/44* (2013.01); *F16D 65/567* (2013.01); *F16D 2125/24* (2013.01)

(58) Field of Classification Search
CPC .... F16D 55/2245; F16D 65/183; F16D 65/44; F16D 65/567; F16D 2125/24; B61H 13/04
See application file for complete search history.

(56) References Cited

FOREIGN PATENT DOCUMENTS

| | | |
|---|---|---|
| FR | 3027270 A1 | 4/2016 |
| WO | 2017149244 A1 | 9/2017 |
| WO | 2017149245 A1 | 9/2017 |

OTHER PUBLICATIONS

English Translation of International Search Report mailed Jun. 29, 2020 for corresponding Application No. PCT/FR2020/050415 (2 pages).

* cited by examiner

VEHICLE BRAKING SYSTEM COMPRISING A SERVICE BRAKE INDICATOR DEVICE AND VEHICLE PROVIDED WITH SUCH A SYSTEM

CROSS-REFERENCE TO RELATED APPLICATIONS

This application is a national stage entry of, and claims priority to, International Patent Application No. PCT/FR2020/050415 (filed 2 Mar. 2020), which claims priority to French Patent Application No. 1902198 (filed 4 Mar. 2019). The entire disclosures of these applications are incorporated herein by reference.

BACKGROUND

Technical Field

The inventive subject matter concerns the field of vehicle brakes, such as rail vehicle brakes. More particularly, the inventive subject matter concerns a braking system for a rail vehicle, comprising an indicator device provided to indicate a state of a service brake of the braking system. The inventive subject matter also concerns the rail vehicles comprising such a system.

State of the Art

Rail vehicles are generally equipped with service brake cylinders comprising a piston movable under the effect of a fluid under pressure, the movement of that piston driving a braking action such as the clamping of a disk brake between two linings, or the direct pressure of a block against a vehicle wheel.

These brake cylinders also generally comprise a parking or emergency actuator which is actuated in case of pressure loss of the fluid under pressure and/or in case of intentional venting (or draining) or leakage of the pneumatic system. This actuator, also termed parking brake, makes it possible to provide braking by virtue of the load of one or more springs substituting for the load of the fluid. Once this parking brake has been activated, the brake remains continuously engaged.

From European patent application EP 2 826 684 there is known a rail vehicle braking system provided in particular with a parking brake disposed in the service brake cylinder and comprising a blocking device configured to act on a rod of the brake piston of the service brake, and an actuating device of the blocking device. The blocking device and the actuating device are configured such that, when the braking piston is in a service braking position and the parking brake is in working configuration, the actuating device acts on the blocking device until the latter immobilizes the piston rod so as to block the braking piston in its service braking position, and when the parking brake is in resting configuration, the actuating device acts on the blocking device until the latter releases the piston rod so as to unblock the braking piston from its service braking position.

These braking systems are mounted on the rail vehicle, to be in contact with the brake disks or the wheels. In particular, the braking systems may be mechanically connected to the bogies, or to the axles fastened to the bogies, or on other devices like the drive motor or the gearbox also mounted on the bogies.

BRIEF SUMMARY

The inventive subject matter concerns a braking system for a vehicle, comprising an indicator device provided to reliably indicate a state of a service brake of the system, while being simple, convenient, and economical.

According to a first aspect, the inventive subject matter is thus directed to a vehicle braking system having brakes with at least one lining or at least one block. The system includes a body, a braking linkage configured to act on at least one of the brakes, a service brake comprising a braking piston movable relative to the body to act on the braking linkage and delimiting (with the body) the service brake pressure chamber. The service brake pressure chamber is configured to be supplied by a first source of pneumatic pressure agent to place the braking piston in a service braking position. The braking system also includes a parking brake configured to act on the braking piston of the service brake and having a working configuration and a resting configuration. The parking brake includes a blocking device movable relative to the body to act on the braking piston and having a first position and a second position in which the blocking device is configured to immobilize the braking piston in a service braking position. The parking brake then is in a working configuration. The braking system also includes a control device movable relative to the body and having a locking position in which the control device is configured to hold the blocking device in the second position. The system also comprises a service brake indicator device configured to receive at least one item of information representing the supply and/or the venting of the service brake pressure chamber by the first pneumatic pressure agent.

By service braking position, it is meant that a movement of the braking piston further to an actual service brake setting, an emergency brake setting, or a preset setting (as described below).

The rail vehicle braking system is configured to supply the service brake pressure chamber with another pneumatic pressure agent of which the pressure value is determined, so as to apply a determined braking force when the parking brake is in a working configuration. The service brake indicator device is configured to receive at least one item of information representing the supply and/or the venting of the service brake pressure chamber by the other pneumatic pressure agent.

The indicator device of the rail vehicle braking system is thus configured to detect and indicate the state in which the service brake is, taking into account the state of the service brake pressure chamber, whether the pressure chamber be supplied by the first pneumatic pressure agent or by the other pneumatic pressure agent.

Taking into consideration the state of the service brake pressure chamber may be carried out by receiving an item of information directly concerning the pressure in that chamber or else concerning settings for application of the parking brake and/or of the service brake.

Features according to the inventive subject matter that are preferred, simple, convenient, and economical are presented below.

The system may furthermore comprise a relay device configured to generate, from the first pneumatic pressure agent, a pressure for use at a determined flow rate for the filling of the service brake pressure chamber to place the braking piston in the service braking position. The relay device is connected to the service brake pressure chamber by a first supply pipe of the service brake.

The service brake indicator device may comprise at least one service contactor device (referred to as second service contactor device) connected via a state pipe to a service brake pipe located upstream of the relay device. The contactor device is configured to retrieve the item of information representing the supply and/or the venting of the service brake pressure chamber.

The service brake indicator device may furthermore comprise a first service contactor device which is connected to a first supply pipe of the service brake, a third service contactor device connected via a state pipe to a parking brake pipe, and/or a fourth service contactor device connected via a state pipe to a parking brake pipe.

The service brake indicator device may comprise a second service contactor device which is connected via a state pipe to a service brake pipe and the first, third and fourth respective service contactor devices. The third and fourth respective contactor devices can be connected to the first and second service contactor devices and furthermore to visual service indication devices of the indicator device.

The first, second, third, and/or fourth service contactor devices may be formed by pressure switches or sensors.

The system may be configured such that, when the first service contactor device receives an item of information from the first supply pipe according to which the latter supplies the service brake pressure chamber and the fourth service contactor device receives an item of information from the state pipe according to which there is no parking brake setting in the parking brake pipe, the service brake is in the engaged state and the visual service indication device is then turned on. The system also may be configured such that, when the second service contactor device receives an item of information from the state pipe according to which there is a service brake setting in the service brake pipe and the fourth service contactor device receives an item of information from the state pipe according to which there is a parking brake setting in the parking brake pipe constituting a setting for application of the parking brake, the service brake is in the engaged state and the visual service indication device is then turned on.

The system may be configured such that, when the first service contactor device receives an item of information from the first supply pipe according to which the latter does not supply the service brake pressure chamber and the third service contactor device receives an item of information from the state pipe according to which there is no parking brake setting in the parking brake pipe, the service brake is in the disengaged state and the visual service indication device is then turned on. The system also may be configured such that, when the second service contactor device receives an item of information from the state pipe according to which there is no service brake setting in the service brake pipe and the third service contactor device receives an item of information from the state pipe according to which there is a parking brake setting in the parking brake pipe constituting a setting for application of the parking brake, the service brake is in the disengaged state and the visual service indication device is then turned on.

The system may be configured such that, when the first service contactor device receives an item of information from the first supply pipe according to which the latter supplies the service brake pressure chamber and the second service contactor device receives an item of information from the state pipe according to which there is a service brake setting in the service brake pipe, the service brake is in the engaged state and the visual service indication device is then turned on.

The system may be configured such that, when the first service contactor device receives an item of information from the first supply pipe according to which the latter does not supply the pressure chamber of the service brake, the service brake is in the disengaged state and the visual service indication device is then turned on. The system also may be configured such that, when the first service contactor device receives an item of information from the first supply pipe according to which the latter supplies the service brake pressure chamber and the second service contactor device receives an item of information from the state pipe according to which there is no service brake setting in the service brake pipe, the service brake should be in the disengaged state and the visual service indication device is then turned on.

The third service contactor device may be interposed between the first and second service contactor devices.

The system may be configured such that, when the first service contactor device receives an item of information from the first supply pipe according to which the latter supplies the service brake pressure chamber, the third service contactor device receives an item of information from the state pipe according to which there is a parking brake setting in the parking brake pipe constituting a setting for application of the parking brake, and the second service contactor device receives an item of information from the state pipe according to which there is a service brake setting in the service brake pipe, the service brake is in the engaged state and the service visual indication device is then turned on. The system also may be configured such that, when the first service contactor device receives an item of information from the first supply pipe according to which the latter supplies the service brake pressure chamber and the third service contactor device receives an item of information from the state pipe according to which there is no parking brake setting in the parking brake pipe, the service brake is in the engaged state and the visual service indication device is then turned on.

The system may be configured such that, when the first service contactor device receives an item of information from the first supply pipe according to which the latter supplies the service brake pressure chamber, the third service contactor device receives an item of information from the state pipe according to which there is a parking brake setting in the parking brake pipe constituting a setting for application of the parking brake, and the second service contactor device receives an item of information from the state pipe according to which there is no service brake setting in the service brake pipe, the service brake is in the disengaged state and the service visual indication device is then turned on. The system also may be configured such that, when the first service contactor device receives an item of information from the first supply pipe according to which the latter does not supply the pressure chamber of the service brake, the service brake is in the disengaged state and the visual service indication device is then turned on.

According to a second aspect, the invention also relates to a rail vehicle with brakes having at least one lining or at least one block, comprising at least one rail vehicle braking system as described above and configured to act on said at least one lining or on said at least one block of said rail vehicle.

BRIEF DESCRIPTION OF THE DRAWINGS

The disclosure of the inventive subject matter will now be continued with the description of embodiments, given below by way of illustrative and non-limiting examples, with reference to the accompanying drawings.

DETAILED DESCRIPTION

Figure 1:
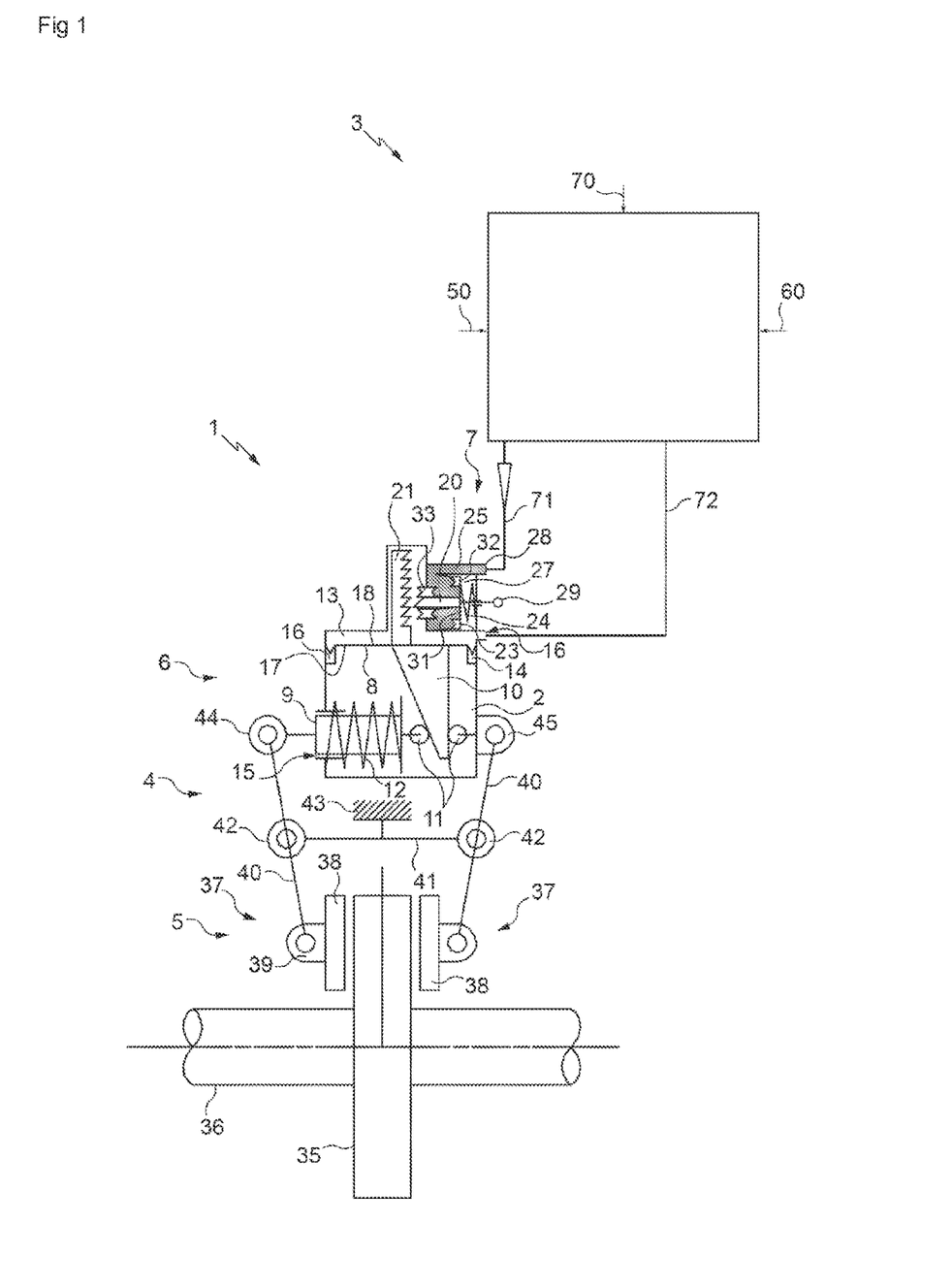
FIG. 1 is a diagrammatic and partial illustration of a rail vehicle braking system provided in particular with a service brake, a parking brake, and a control and actuation unit.

FIG. 1 diagrammatically represents a rail vehicle braking system 1 for a rail vehicle with a brake having linings or blocks.

This is a rail vehicle braking system structurally of the type described in European patent application EP 2 826 684.

The rail vehicle braking system 1 comprises a body 2 here forming a cylinder of a service brake 6 and a parking brake 7, a control and actuation unit 3 configured to manage the operation of the service brake 6 and of the parking brake 7, a conveyance network of pneumatic pipes that is connected to the body 2 and to the control and actuation unit 3, a braking linkage 4 mechanically linked to the body 2 as well as a brake 5 with linings on which the braking linkage 4 is configured to act.

The body 2 here has the form of a generally closed envelope.

The service brake 6 comprises a service brake piston 8 movable relative to the body 2 in a first axial direction, and a thrust rod 9 also movable relative to the body 2 in a second axial direction perpendicular to the first axial direction.

Together with the body 2 the braking piston 8 delimits a service brake pressure chamber 13.

The braking piston 8 has two sides respectively a first side 17 configured to act on the braking linkage 4 via the thrust rod 9 and a second side 18 which is an opposite side to the first side 17 and which is turned towards the service brake pressure chamber 13.

The service brake 6 further comprises a notched rod 21 fastened to the second side 18 of the braking piston 8. This notched rod 21 extends longitudinally in the first axial direction.

The braking piston 8 is configured to move in the body 2 while maintaining the service brake pressure chamber 13 relatively fluid-tight thanks to a membrane 14, for example formed by a seal, disposed between that braking piston 8 and inside edges of the body 2.

The service brake 6 may further comprise a wedge part 10 fastened to the first side 17 of the braking piston 8.

This wedge part 10 may have a triangular section and be configured to cooperate with a set of rolling bearing stops 11, of which one of the rolling bearing stops may be linked to the body 2 while the other of the rolling bearing stops may be linked to the thrust rod 9.

This thrust rod 9 may be provided with a wear adjuster configured to compensate for the wear of the linings of the brake 5 in order to avoid reduction of the braking force by excessive play (further to wear of the linings).

The service brake 6 may comprise a spring 12 disposed around the thrust rod 9, between the rolling bearing stop which is linked to the latter and an inside edge of the body 2. This spring 12 is configured to return the stop which is linked to the thrust rod 9 against the wedge part 10.

The service brake 6 may comprise a first aperture 15 formed in the body 2 and configured to enable the movement of the thrust rod 9 through that first aperture 15.

The service brake 6 may comprise a second aperture 16 formed in the body 2 and opening into the service brake pressure chamber 13.

Figure 2:
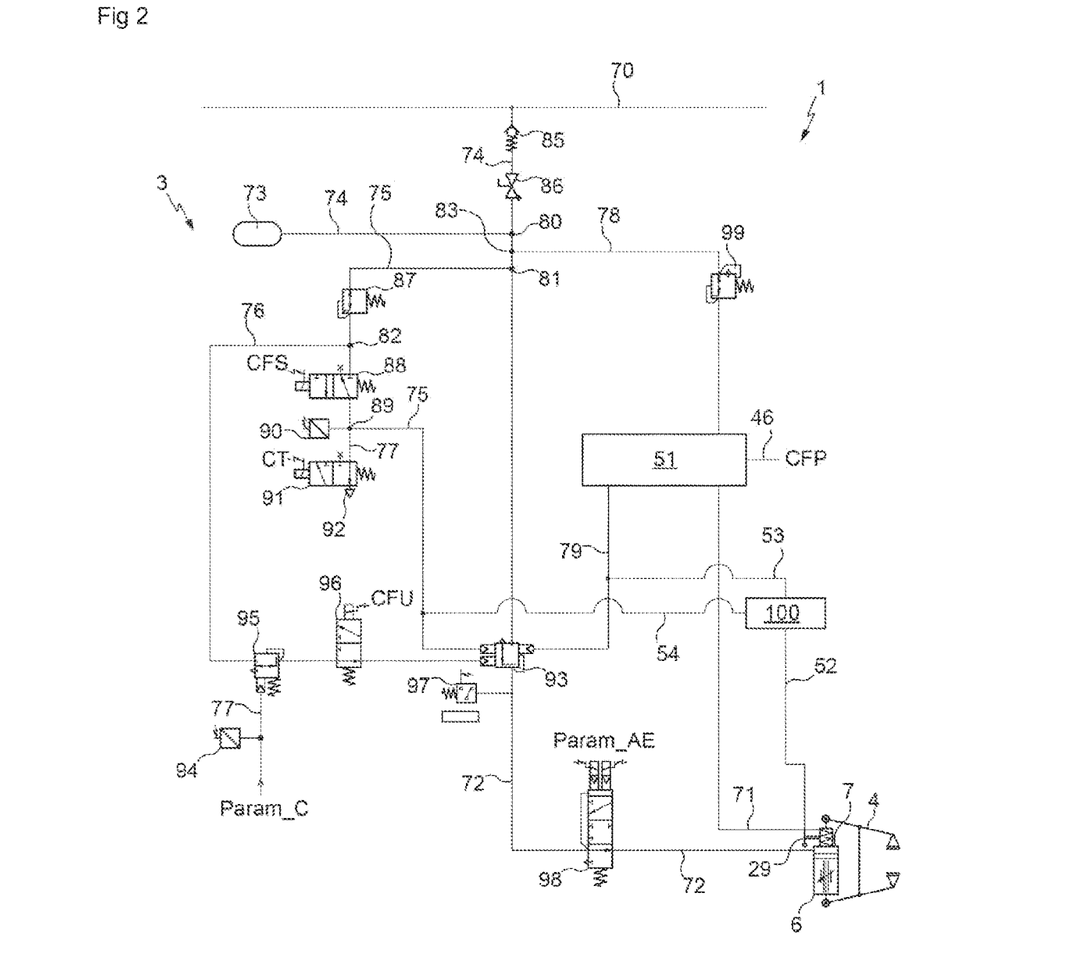
FIG. 2 represents diagrammatically and in more detail the control and actuation unit illustrated in FIG. 1 and a conveyance network of pipes of the system, which is connected to that unit.

The service brake pressure chamber 13 is connected here by a first supply pipe 72 of the conveyance network of pneumatic pipes, more generally called brake pipe, which pipe is connected at the location of that second aperture 16, to a source of supply of pneumatic pressure agents 73 (visible in FIG. 2).

The body 2 comprises a cavity 27 situated against the service brake pressure chamber 13 and in which is disposed the parking brake 7.

The parking brake 7 comprises a blocking device formed by a blocking finger 20 movable relative to the body 2 and extending in the second axial direction.

The parking brake 7 comprises a holding piston 23 movable relative to the body 2 and with the latter delimiting a parking brake pressure chamber 25.

This holding piston 23 has two sides, respectively a first side 31 on which is attached the blocking finger 20 and which is turned towards the parking brake pressure chamber 25, and a second side 32 which is an opposite side to the first side.

The parking brake 7 comprises a spring member 24 disposed between the body 2 and the second side 32 of the holding piston 23. This spring member 24 is configured to act on that holding piston 23 and therefore on the blocking finger 20.

The holding piston 23 and the spring member 24 may form a movable actuating device of the parking brake 7.

The holding piston 23 is configured to move in the body 2 while maintaining the parking brake pressure chamber 25 relatively fluid-tight thanks to a membrane disposed between that holding piston 23 and the inside edges of the body 2.

The parking brake 7 comprises a third aperture (not shown) formed in the body 2 and opening both into the parking brake pressure chamber 25 and into the service brake pressure chamber 13, which third aperture is configured to enable the movement of the blocking finger 20 through that third aperture.

The relative sealing between the parking brake pressure chamber 25 and the service brake pressure chamber 13 is ensured by the presence of a seal 33 disposed at the interface between that third aperture and the blocking finger 20.

The parking brake 7 comprises a fourth aperture 28 formed in the body 2 and opening into the parking brake pressure chamber 25.

The parking brake pressure chamber 25 may be connected here by a second supply pipe 71 of the conveyance network of pneumatic pipes, also called parking brake pipe, which is connected at the location of that fourth aperture 28, to the source of supply of pneumatic pressure agents 73 (visible in FIG. 2) via the unit 3.

The parking brake 7 comprises an unlocking part 29 to deactivate the parking brake 7.

The unlocking part 29 may for example be attached on the second side 32 of the holding piston 23 and open to the outside of the body 2 through a fifth aperture (not shown) provided in that body 2 and opening into the cavity 27.

The unlocking part 29 is accessible to be manipulated from outside the body 2 if required.

As explained later, the unlocking part 29 is connected to an indicator device provided to indicate a state of the parking brake 7 and/or a state of the service brake 6.

In particular, the unlocking part 29 may be coupled to a switch mechanically connected to that part 29 and having a first position and a second position selected according to the position of the unlocking part 29.

The service brake 6 is disposed in the body 2 and is configured to act on the brake 5 via the braking linkage 4.

This brake 5 may comprise a brake disk 35 (here viewed from above) mounted for example on a rail vehicle axle 36, or directly on the wheel to brake.

This brake 5 may comprise two shoes 37 each provided with a lining 38 configured to be applied in contact with the disk 35 to reduce its rotational speed and therefore that of the wheel to brake, as well as a fastening eye 39 provided at the remote opposite location to the surface of the lining 38 that is configured to be applied to the disk brake 35.

The braking linkage 4 may comprise two or four deformable levers 40 each provided with an upper portion and a lower portion which are attached to each other. Only two levers are illustrated here and, in the case of the linkage having four levers, they may be attached in pairs or as a variant be independent from each other.

Each portion of the levers 40 may be jointed to a central connector 41 via two pivots 42.

The lower portion of each deformable lever 40 may be linked to one of the shoes 37 via its fastening eye 39.

The upper portion of each deformable lever 40 may be linked to a respective joint 44, 45.

The braking linkage 4 may receive the body 2 between the upper portions of the deformable levers 40, at the location of the joints 44 and 45.

The body 2 may be rotatably mounted on the joint 44 which is attached to an end of the thrust rod 9 whereas it may have a fixed mounting to the joint 45, which is directly attached to that body 2.

The braking linkage 4 may comprise a fastening lug 43 joined to the central connector 41 for the mounting of that braking linkage 4 on the rail vehicle; in order for the brake shoes 37 to be situated on respective opposite sides of the brake disk 35 (or of the wheel of the rail vehicle).

The coming towards each other of the joints 44 and 45 may enable the shoes 37 to move apart from each other and that conversely, the separation of those joints 44 and 45 may enable the shoes 37 to be to clamped onto the brake disk 35 (or onto the rail vehicle wheel).

The control and actuation unit 3 is connected to the service brake pressure chamber 13 via the first supply pipe 72 to which it is connected.

This unit 3 is connected to the parking brake pressure chamber 25 via the second supply pipe 71 to which it is connected.

This unit 3 is supplied with pneumatic agents by a main pipe 70 which passes generally along the rail vehicle.

The unit 3 comprises system members (not shown in FIG. 1) which are configured to receive and process representational information relative for example to operational settings of the rail vehicle, by a first electrical and/or pneumatic and/or manual type channel, denoted 50 in FIG. 1.

These system members are furthermore configured to receive and process representational information relating to parameters of use of the rail vehicle, by a second channel of electrical and/or pneumatic and/or manual type, which is denoted 60 in FIG. 1.

These system members may for example be formed by pneumatic relays and/or solenoids and/or pressure switches and/or sensors and/or pressure reducing valves and/or electrical relays and/or electronic cards and/or central processing units or microprocessors, and/or random access memory components comprising registers adapted to record variables of the parameters created and modified during the execution of programs, and/or communication interfaces configured to send and receive data, and/or internal storage members, such as hard disks, able in particular to store the executable code of programs enabling the management of the service and parking brakes 6 and 7.

The control and actuation unit 3 is associated here with a braking linkage and with a single brake 5 of the rail vehicle.

As a variant, such a control and actuation unit may be associated with an axle (not shown) of the rail vehicle, provided with a plurality of brakes 5, or with a bogie (not shown) of the rail vehicle, provided with two axles, or for instance with a wagon (not shown) of the rail vehicle, provided with two bogies, or it is possible for the rail vehicle to comprise only a single such control and actuation unit.

FIG. 2 diagrammatically represents the conveyance network of pneumatic pipes and the control and actuation unit 3.

The main pipe 70 forms the channel for conveyance of a pneumatic agent distributed in the conveyance network of pneumatic pipes.

The agent in this main pipe 70 may for example be at a pressure value of approximately 9 bars.

The network may comprise what is referred to as a general pipe (not shown), distinct from the main pipe 70, and generally extending in parallel thereto.

The general pipe may enable pneumatic continuity to be ensured along the rail vehicle and may authorize the service braking of the vehicle, by directly using the fluid passing through the general pipe.

As regards the main pipe 70, this may enable equipment particularly for example of the rail vehicle braking system to be supplied, and in particular the source of supply of pneumatic pressure agents 73 here formed by what is referred to as an auxiliary reservoir.

This network may comprise a filling and distribution pipe 74 which may be tapped onto (that is to say directly connected to) the main pipe 70, and/or a service brake pipe 75 connected by a tapping 81 onto the filling and distribution pipe 74, and/or an emergency brake pipe 76 tapped onto the service brake pipe 75 by a tapping 82, and/or a control pipe 78 connected by a tapping 83 onto the filling and distribution pipe 74.

The control pipe 78 may be subdivided into two pipes at the location of a branch tapping 84, respectively to form the parking brake pipe 71 directly communicating with the parking brake pressure chamber 25 and into an oversupply pipe, referred to hereinafter as preset pipe 79 or parking brake pipe or for instance parking brake setting pipe.

Each service brake pipe 75 and/or emergency brake pipe 76 and/or preset pipe 79 may join the brake pipe 72 which directly communicates with the service brake pressure chamber 13.

The filling and distribution pipe 74 may have a first filling section extending between the tapping (not shown) onto the main pipe 70 and the auxiliary reservoir 73, as well as a second distribution section extending from a tapping 80 onto the first section.

The control and actuation unit 3 may comprise a one-way valve 85 disposed on the first section of the filling and distribution pipe 74 near the tapping of the latter onto the main pipe 70, and possibly an isolation tap 86 also disposed on that first section.

The non-return valve 85 may enable the filling of the auxiliary reservoir 73 by the pneumatic pressure agent coming from the main pipe 70 and prohibit the venting of the reservoir 73 into the main pipe 70 if the pressure in the latter becomes less than that in the auxiliary reservoir 73.

The control and actuation unit 3 may comprise a relay device 93, or pneumatic relay, supplied by the second distribution section of the filling and distribution pipe 74 and connected to the brake pipe 72.

This relay device 93 may be configured to generate, from that second distribution section and from template values of pressure, a pressure of use at a determined throughput for the filling of the service brake pressure chamber 13.

These template values of pressure may correspond to service brake and emergency brake pressure settings and preset, respectively coming from the service brake pipe 75, the emergency brake pipe 76 and from the preset pipe 79.

The control and actuation unit 3 may comprise, on the service brake pipe 75, a pressure reducing valve 87 configured to limit the pressure value for example here to approximately 4 bars as well as a distribution device 88 formed for example by a monostable solenoid valve and configured to receive a control signal corresponding to a service brake setting CFS.

When the setting value CFS is null, the distribution device 88 may be configured to interrupt the service brake pipe 75; and when the setting value CFS is not null, the device 88 may be configured to authorize the passage of a pneumatic pressure agent, called first pressure agent, to the relay device 93 which receives a service brake pressure template value and which generates a service brake pressure to supply the service brake pressure chamber 13 for the braking of the vehicle.

The control and actuation unit 3 may comprise a pressure sensor 90 connected to a tapping 89 onto the service brake pipe 75 and which makes it possible to control the service brake pressure template value.

The control and actuation unit 3 may comprise a venting solenoid valve 91 connected by the tapping 89 onto the service brake pipe 75 and which makes it possible to vent that pipe via a venting aperture 92 on that solenoid valve 91.

The solenoid valve 91 may be monostable and be configured for receiving a control signal corresponding to a work setting CT and for operating in reverse.

When the setting value CT is not null, the solenoid valve 91 may be configured to interrupt the communication of the service brake pipe 75 with the venting aperture 92; and when the setting value CT is null, that solenoid valve 91 may be configured to allow the communication of that pipe 75 with that venting aperture 92.

The control and actuation unit 3 may comprise, on the emergency brake pipe 76, a distribution device 96 formed here by a monostable solenoid valve operating in reverse and configured to receive a control signal corresponding to an emergency brake setting CFU.

When the setting value CFU is not null, the distribution device 96 may be configured to interrupt the emergency brake pipe 76; and when the setting value CFU is null, the device 96 may be configured to authorize the passage of a pneumatic pressure agent to the relay device 93 which receives an emergency brake pressure template value and which generates an emergency brake pressure to supply the service brake pressure chamber 13 for the emergency braking of the vehicle.

The control and actuation unit 3 may comprise a pressure limiter 95 (or pressure reducing valve) on the emergency brake pipe 76 upstream of the distribution device 96, which limiter 95 may be controlled according to a load parameter param_C of the vehicle received via a load pipe 77 connected to the limiter 95; and a pressure sensor 94 which may be tapped onto the load pipe 77.

The load parameter param_C is an information item representing the vehicle load and may for example concern a single wagon, or several successive wagons or the entirety of the rail vehicle.

It will furthermore be noted that certain parameters of operation of certain rail vehicles may naturally (or initially) be dependent on the vehicle load for example to manage the service brake whereas others are not dependent on the vehicle load.

The control and actuation unit 3 may comprise on the brake pipe 72, a pressure switch 97 downstream of the relay device 93 and configured to check whether or not a pneumatic pressure agent, has a pressure value at least greater than a predetermined threshold value, in the brake pipe 72 and therefore whether there is a pressure in the service brake pressure chamber 13.

The control and actuation unit 3 may comprise on the brake pipe 72 an anti-wheel-slide device 98 here formed by a monostable solenoid valve and configured to receive control signals which correspond to anti-wheel-slide parameters Param_AE of the vehicle; so as to ensure the effectiveness of the rail vehicle braking.

These anti-wheel-slide parameters Param_AE are information items representing the anti-wheel-slide or the wheel-slide of the vehicle and may for example correspond to the load of the vehicle, to its speed of locomotion as well as to the service and/or emergency brake template values.

The control and actuation unit 3 may comprise on its control pipe 78 a pressure reducing valve 99 configured to limit the pressure value for example here to approximately 6 bars.

The control and actuation unit 3 may comprise one or more pneumatic distribution devices 51 dedicated to the parking brake pipe 71 and to the preset pipe 79.

The pneumatic distribution device or devices 51 may be formed for example by monostable distributors, also called solenoid valves, connected to the control pipe 78 and/or the brake pipe 72 via the preset pipe 79 and/or the relay device 93, and/or the parking brake pipe 71.

The pneumatic distribution device or devices 51 may be controlled via a control line 46 configured to distribute a setting for application of the parking brake CFP.

When the parking brake application setting CFP is null, this may mean that the parking brake 7 must be applied. In this case this is referred to as a security application.

If required, the pneumatic distribution device or devices 51 may be configured to disconnect the parking brake pressure chamber 25 from the auxiliary reservoir 73.

The parking brake pressure chamber 25 can then be vented and the blocking finger 20 can come to immobilize the rod 21 of the piston 8. The parking brake is applied. It is in what is referred to as an engaged state.

At the same time, the pneumatic distribution device or devices 51 may be configured to connect the service brake pressure chamber 13 via the brake pipe 72 to the auxiliary reservoir 73 via the control pipe 78 and the supply and distribution pipe 74.

Authorization may thus be given to the passage of a pneumatic pressure agent, referred to as third pressure agent, to the relay device 93 which receives a pressure preset template value and which generates a pressure preset to supply the service brake pressure chamber 13 if required.

To release application of the parking brake 7, a non-null setting for application of the parking brake CFP may be conveyed in the control line 46.

If required, the pneumatic distribution device or devices 51 may be configured to connect the parking brake pressure chamber 25 via the parking brake pipe 71 to the auxiliary reservoir 73 via the control pipe 78 and the supply and distribution pipe 74.

Authorization may thus be given for the passage of a pneumatic pressure agent, referred to as second pressure agent, directly to the parking brake pressure chamber 25 via the parking brake pipe 71. The blocking finger 20 is then withdrawn into that chamber and releases the rod 21 of the piston 8.

At the same time, the pneumatic distribution device or devices 51 may be configured to disconnect the service brake pressure chamber 13 from the auxiliary reservoir 73.

The passage of the third pneumatic pressure agent to the relay device 93 may thus be prohibited and the latter thus does not receive a pressure preset template value and vents the pressure preset if required.

The parking brake is then not applied. It is in what is referred to as a disengaged state.

The control and actuation unit 3 comprises an indicator device 100 configured to detect and indicate what the state is of the parking brake 7 and/or of the service brake 6.

The indicator device 100 indicating what the state is of the parking brake 7 and/or of the service brake 6 is configured to receive an item of information representing the venting and/or the supply of the parking brake pressure chamber 25, via a first state pipe 52 which is connected to the unlocking part 29 for unlocking the parking brake 7.

The indicator device 100 configured to receive an item of information representing the supply of the service brake pressure chamber 13 by the third pneumatic pressure agent, via a second state pipe 53 which is connected to the preset pipe 79.

The indicator device 100 configured to receive an item of information representing the supply of the service brake pressure chamber 13 by the first pneumatic pressure agent, via a third state pipe 54 which is connected to the service brake pipe 75.

This indicator device 100 may be configured to retrieve these items of information for example directly from the parking brake pipe 71 and/or from the preset pipe 79 and/or from the service brake pipe 75.

Figure 3:
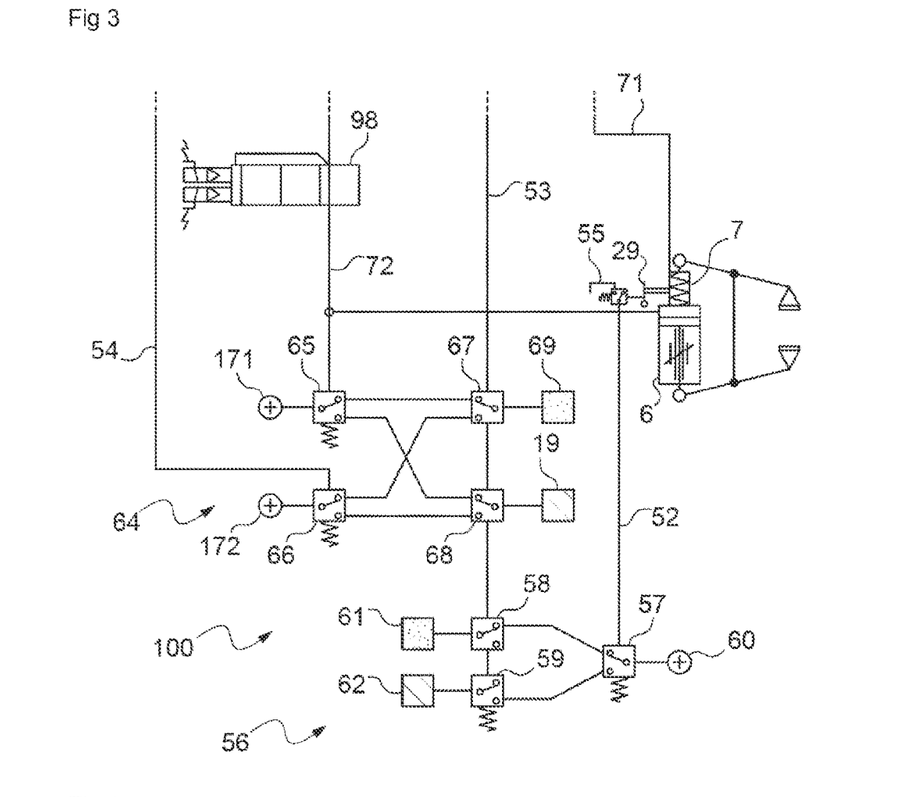
FIG. 3 shows in more detail part of the control and actuation unit illustrated in FIG. 2, i.e. a parking brake and/or service brake indicator device of the rail vehicle braking system.

FIG. 3 shows in more detail the indicator device 100 indicating what the state is of the parking brake 7 and/or of the service brake 6.

The indicator device 100 is provided with a first switching system 56 provided for indicating the state of the parking brake 7.

The first switching system 56 may comprise a first parking contactor device 55 mechanically connected to the unlocking part 29, a second parking contactor device 57 which is connected via the first state pipe 52 to the first parking contactor device 55, a third parking contactor device 58 and a fourth parking contactor device 59 which are each connected via the second state pipe 53 to the preset pipe 79.

The second parking contactor device 57 may be electrically supplied via an electrical source 60.

The third and fourth respective parking contactor devices 58 and 59 are furthermore respectively connected to the second parking contactor device 57 and to respective visual parking indication devices 61 and 62.

The third and fourth respective parking contactor devices 58 and 59 may for example be formed by pressure switches or sensors.

The indicator device 100 is provided with a second switching system 64 provided for indicating the state of the parking brake 6.

The second switching system 64 may comprise a first service contactor device 65 which is connected to the first supply pipe 72, a second service contactor device 66 which is connected via the third state pipe 54 to the service brake pipe 75, a third service contactor device 67 connected via the second state pipe 53 to the preset pipe 79, and a fourth service contactor device 68 connected via the second state pipe 53 to the preset pipe 79.

The first and second service contactor devices 65 and 66 may be electrically supplied via a respective electrical source 171, 172.

The third and fourth respective parking contactor devices 67 and 68 are furthermore respectively connected to the second parking contactor device 65 and 66, and to respective visual parking indication devices 69 and 19.

The first, second, third and fourth service contactor devices 65, 66, 67 and 68 may for example be formed by pressure switches or sensors.

Figure 4:
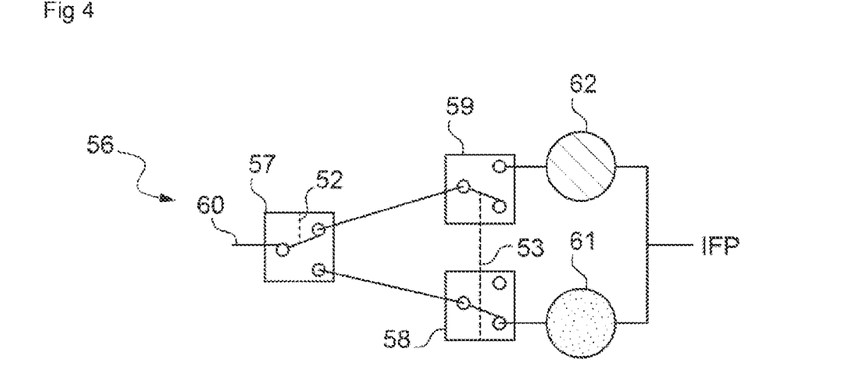
FIG. 4 shows the part of the indicator device illustrated in FIG. 3 and which is in particular provided to indicate a state of the parking brake.

With reference to FIGS. 4 to 7 a description will be given of the operation of the first switching system 56 provided to indicate the state of the parking brake 7, denoted IFP in FIG. 4.

The IFP information may for example result in a red indicator light generated by the visual parking indication device 62 when the parking brake 7 is in the engaged state; whereas it may for example result in a green indicator light generated by the visual parking indication device 61 when the parking brake 7 is in the disengaged state.

In particular, when the second parking contactor device 57 receives an item of information from the first state pipe 52 according to which the unlocking part 29 is in an unlocking position and the fourth parking contactor device 59 receives an item of information from the second state pipe 53 according to which there is a preset setting in the preset pipe 79 corresponding to a setting for application of the parking brake 7, this means that the parking brake 7 is in the engaged state and the visual parking indication device 62 is then on.

Conversely, if the second parking contactor device 57 receives an item of information from the first state pipe 52 according to which the unlocking part 29 is in an unlocking position, and the third parking contactor device 58 receives an item of information from the second state pipe 53 according to which there is no preset setting in the preset pipe 79 corresponding to a setting for application of the parking brake 7, this means that the parking brake 7 is in the disengaged state and the visual parking indication device 61 is then on.

The third and fourth respective parking contactor devices 58 and 59 may for example be actuated according to a predetermined threshold of the pressure preset value, or of the pressure preset template value.

Figure 5:
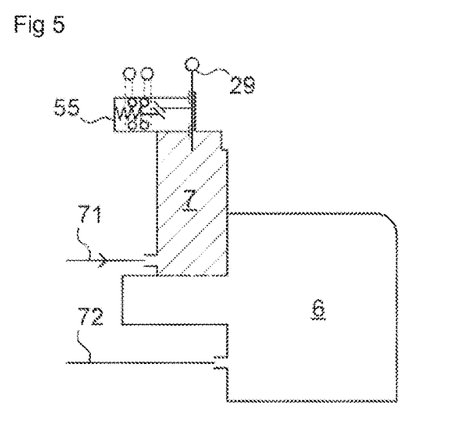
FIG. 5 illustrates a first configuration of the parking brake.
Figure 6:
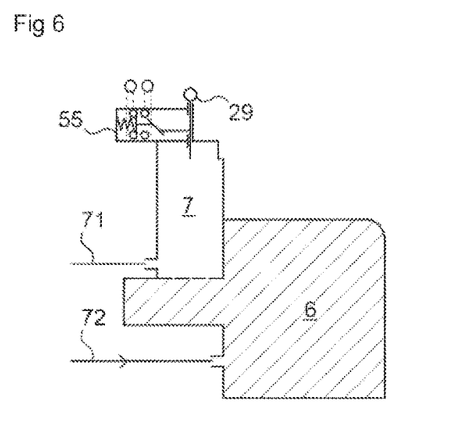
FIG. 6 illustrates a second configuration of the parking brake.
Figure 7:
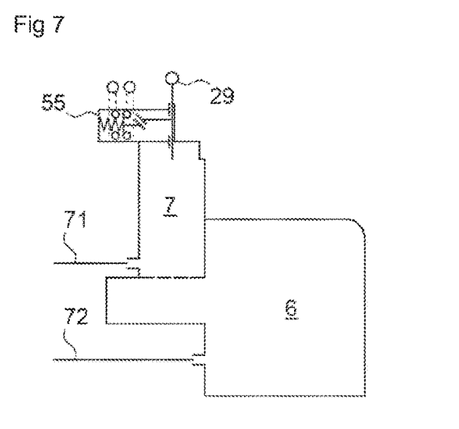
FIG. 7 illustrates a third configuration of the parking brake.

FIGS. 5 to 7 show very diagrammatically what are the conditions of use of the parking brake 7 and/or of the service brake 6 in which the first parking contactor device 55 sends an item of information relating to the position of the unlocking part 29 to the second parking contactor device 57 via the first state pipe 52.

In FIG. 5, the first supply pipe 72 does not supply the pressure chamber of the service brake 6 and the second supply pipe 71 supplies the pressure chamber of the parking brake 7; such that the parking brake 7 is in the disengaged state. The unlocking part 29 is in an unlocking position and the first parking contactor device 55 sends the information to the second parking contactor device 57.

In FIG. 6, the first supply pipe 72 supplies the pressure chamber of the service brake 6 and the second supply pipe 71 does not supply the pressure chamber of the parking brake 7; such that the parking brake 7 is in the engaged state. The unlocking part 29 is in a locking position and the first parking contactor device 55 sends the information to the second parking contactor device 57.

In FIG. 7, the first supply pipe 72 does not supply the pressure chamber of the service brake 6 and the second supply pipe 71 does not supply the pressure chamber of the parking brake 7; such that the parking brake 7 is in the disengaged state. The unlocking part 29 is in an unlocking position after having been manually shifted, and the first parking contactor device 55 sends the information to the second parking contactor device 57.

As explained above, the information sent by the first parking contactor device 55 to the second parking contactor device 57 via the first state pipe 52 is processed in combination with the information representing the preset setting in the preset pipe 79 for the purpose of indicating whether the parking brake 7 is in the engaged state or in the disengaged state.

Figure 8:
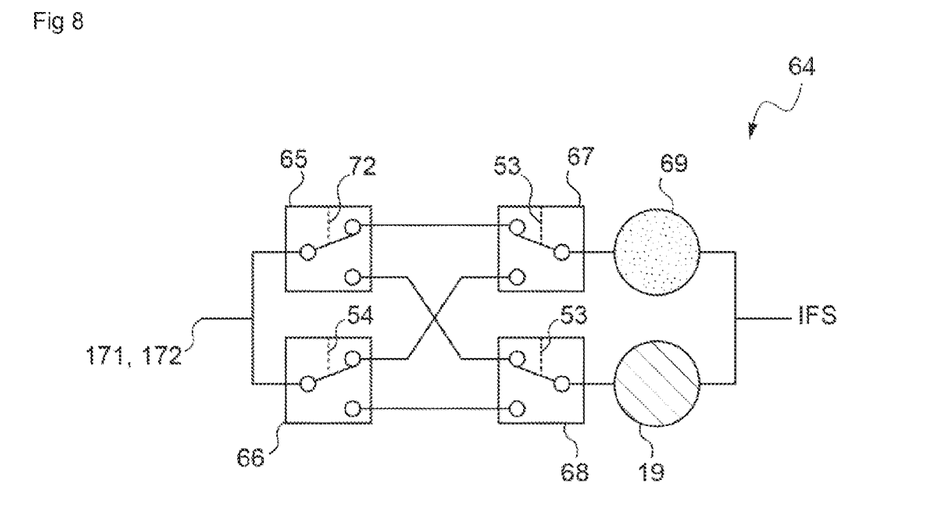
FIG. 8 shows the part of the indicator device illustrated in FIG. 3 and which is in particular provided to indicate a state of the service brake.

With reference to FIG. 8 the operation will now be described of the switching system 64 provided to indicate the state of the service brake 6, denoted IFS.

The IFS information may for example result in a red indicator light generated by the visual service indication device 19 when the service brake 6 is in the engaged state; whereas it may for example result in a green indicator light generated by the visual service indication device 69 when the service brake 6 is in the disengaged state.

In particular, when the first service contactor device 65 receives an item of information from the first supply pipe 72 according to which the latter supplies the service brake pressure chamber 6 and when the fourth service contactor device 68 receives an item of information from the second state pipe 53 according to which there is no preset setting in the preset pipe 79, this means that the service brake 6 is in the engaged state and the visual service indication device 19 is then turned on.

Moreover, if the second service contactor device 66 receives an item of information from the third state pipe 54 according to which there is a service brake setting in the service brake pipe 75 and if the fourth service contactor device 68 receives an item of information from the second state pipe 53 according to which there is a preset setting in the preset pipe 79 corresponding to a setting for application of the parking brake 7, this means that the service brake 6 is in the engaged state and the visual service indication device 19 is then on.

Conversely, when the first service contactor device 65 receives an item of information from the first supply pipe 72 according to which the latter does not supply the service brake pressure chamber 6 and when the third service contactor device 67 receives an item of information from the second state pipe 53 according to which there is no preset setting in the preset pipe 79, this means that the service brake 6 is in the disengaged state and the visual service indication device 69 is then turned on.

Moreover, if the second service contactor device 66 receives an item of information from the third state pipe 54 according to which there is no service brake setting in the service brake pipe 75 and if the third service contactor device 67 receives an item of information from the second state pipe 53 according to which there is a preset setting in the preset pipe 79 corresponding to a setting for application of the parking brake 7, this means that the service brake 6 is in the disengaged state and the visual service indication device 69 is then on.

The first service contactor device 65 may for example be actuated according to a predetermined threshold of service brake pressure value, the second service contactor device 66 may for example be actuated according to a predetermined threshold of service brake pressure template value, and the third and fourth respective service contactor devices 67 and 68 may for example be actuated according to a predetermined threshold of pressure preset value, or of pressure preset template value.

Figure 9:
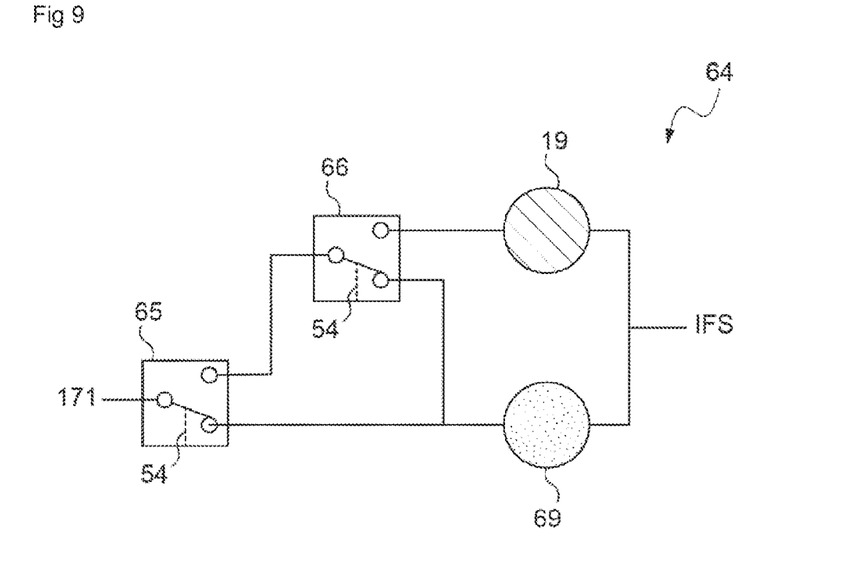
FIG. 9 shows a first variant embodiment of the part of the indicator device provided to indicate a state of the service brake.

FIG. 9 illustrates a first variant embodiment of the second switching system 64 provided to indicate the state of the service brake 6, denoted IFS.

The first and second service contactor devices 65 and 66 are mounted here in series, rather than in parallel, and the third and fourth service contactor devices 67 and 68 are eliminated.

When the first service contactor device 65 receives an item of information from the first supply pipe 72 according to which the latter supplies the service brake pressure chamber 6 and when the second service contactor device 66 receives an item of information from the third state pipe 54 according to which there is a service brake setting in the service brake pipe 78, this means that the service brake 6 is in the engaged state and the visual service indication device 19 is then turned on.

Conversely, if the first service contactor device 65 receives an item of information from the first supply pipe 72 according to which the latter does not supply the pressure chamber of the service brake 6, this means that the service brake 6 is in the disengaged state and the visual service indication device 69 is then turned on.

Furthermore, when the first service contactor device 65 receives an item of information from the first supply pipe 72 according to which the latter supplies the service brake pressure chamber 6 and when the second service contactor device 66 receives an item of information from the third state pipe 54 according to which there is no service brake setting in the service brake pipe 79, this means that the service brake 6 should be in the disengaged state and the visual service indication device 69 is then turned on. However, this variant embodiment does not enable a possible service brake control failure to be intercepted.

Figure 10:
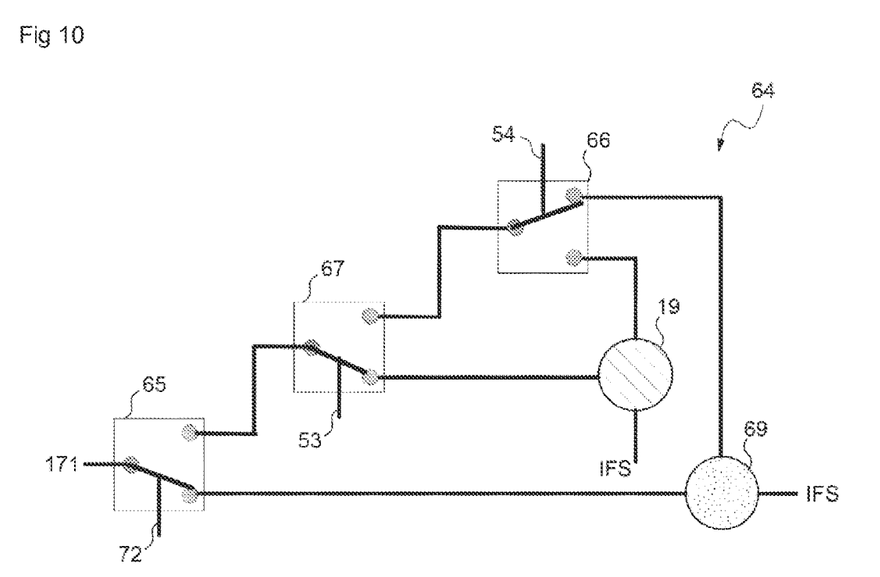
FIG. 10 shows a second variant embodiment of the part of the indicator device provided to indicate a state of the service brake.

FIG. 10 illustrates a second variant embodiment of the second switching system 64 provided to indicate the state of the service brake 6, denoted IFS. This second variant differs from the embodiment illustrated in FIG. 8 in that it is what is referred to as a series arrangement rather than parallel. Furthermore, contrary to the first variant illustrated in FIG. 9 which does not take into account the preset setting, the second variant takes into account the preset setting like the embodiment illustrated in FIG. 8.

In particular, in FIG. 10, the third service contactor device 67 is interposed between the first and second service contactor devices 65 and 66.

When the first service contactor device 65 receives an item of information from the first supply pipe 72 according to which the latter supplies the service brake pressure chamber 6, when the third service contactor device 67 receives an item of information from the second state pipe 53 according to which there is a preset setting in the preset pipe 79 constituting a setting for application of the parking brake 7, and when the second service contactor device 66 receives an item of information from the third state pipe 54 according to which there is a service brake setting in the service brake pipe 78, this means that the service brake 6 is in the engaged state and the service visual indication device 19 is turned on.

Moreover, if the first service contactor device 65 receives an item of information from the first supply pipe 72 according to which the latter supplies the service brake pressure chamber 6 and if the third service contactor device 67 receives an item of information from the second state pipe 53 according to which there is no preset setting in the preset pipe 79, this means that the service brake 6 is in the engaged state and the visual service indication device 19 is then turned on.

Conversely, when the first service contactor device 65 receives an item of information from the first supply pipe 72 according to which the latter supplies the service brake pressure chamber 6, when the third service contactor device 67 receives an item of information from the second state pipe 53 according to which there is a preset setting in the preset pipe 79 constituting a setting for application of the parking brake 7, and when the second service contactor device 66 receives an item of information from the third state pipe 54 according to which there is no service brake setting in the service brake pipe 78, this means that the service brake 6 is in the disengaged state and the service visual indication device 69 is turned on.

Moreover, if the first service contactor device 65 receives an item of information from the first supply pipe 72 according to which the latter does not supply the pressure chamber of the service brake 6, this means that the service brake 6 is in the disengaged state and the visual service indication device 69 is then turned on.

Figure 11:
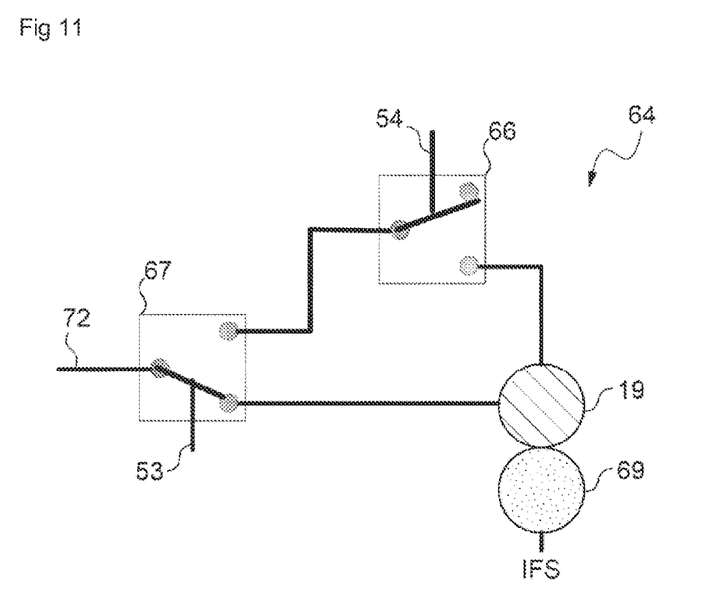
FIG. 11 shows a third variant embodiment of the part of the indicator device provided to indicate a state of the service brake.

FIG. 11 illustrates a third variant embodiment of the second switching system 64 provided to indicate the state of the service brake 6, denoted IFS.

The second and third service contactor devices 66 and 67 are pneumatic threshold valves which are supplied directly via the first supply pipe 72. The first and fourth service contactor devices are eliminated.

In particular, when the first supply pipe 72 supplies the service brake pressure chamber 6 and when the third service contactor device 67 receives an item of information from the second state pipe 53 according to which there is no preset setting in the preset pipe 79, this means that the service brake 6 is in the engaged state such that the visual service indication device 19 is then turned on.

Moreover, when the first supply pipe 72 supplies the service brake pressure chamber 6, when the third service contactor device 67 receives an item of information from the second state pipe 53 according to which there is a preset setting in the preset pipe 79 constituting a setting for application of the parking brake 7, and when the second service contactor device 66 receives an item of information from the third state pipe 54 according to which there is a service brake setting in the service brake pipe 78, this means that the service brake 6 is in the engaged state and the service visual indication device 19 is then turned on.

Conversely, when the first supply pipe 72 does not supply the pressure chamber of the service brake 6, or else when the first supply pipe 72 supplies the service brake pressure chamber 6, when the third contactor device 67 receives an item of information from the second state pipe 53 according to which there is a preset setting in the preset pipe 79 constituting a setting for application of the parking brake 7 and when the second service contactor device 66 receives an item of information from the third state pipe 54 according to which there is no service brake setting in the service brake pipe 78, this means that the service brake 6 is in the disengaged state and the visual service indication device 69 is then visible.

In a variant not illustrated, the rail vehicle braking system is not of the same kind as that described with reference to FIG. 1, but rather a rail vehicle braking system with a parking brake having a spring, of the type described in European patent application EP 2 154 040.

In such a rail vehicle braking system with a parking brake having a spring, the present invention gives the possibility of providing a parking brake indicator device which is provided to indicate the engaged or disengaged state of the latter.

The information relating to the state of the parking brake may for example result in a red indicator light generated by a visual parking indication device when the parking brake is in the engaged state; whereas it may for example result in a green indicator light generated by another visual parking indication device when the parking brake is in the disengaged state.

In particular, the parking brake indicator device may comprise a first parking contactor device mechanically connected to an unlocking part of the same type as that described above and provided to pass the parking brake from its engaged state to its disengaged state.

The parking brake indicator device may further comprise a second parking contactor device which is connected via a first state pipe to the first parking contactor device.

The parking brake indicator device may also comprise a third contactor device connected to another state pipe itself connected either to a supply pipe of the parking brake, or to a setting pipe of the parking brake.

The second and the third parking contactor devices may be electrically supplied via a respective electrical source.

When the second parking contactor device receives an item of information from the state pipe according to which the unlocking part is in a locking position and the third parking contactor device receives an item of information from the other state pipe according to which there is a parking brake setting and/or when the parking brake pressure chamber of the system is not supplied, corresponding to a setting for application of the parking brake, this means that the parking brake is in the engaged state and one of the visual parking indication devices is then turned on.

When the second parking contactor device receives an item of information from the state pipe according to which the unlocking part is in an unlocking position, this means that the parking brake is in the disengaged state and the other of the visual parking indication devices is then turned on, whatever the item of information received by the third parking contactor device or device.

More generally, the invention is not limited to the examples described and illustrated.

What is claimed is:

1. A braking system having brakes with at least one lining or at least one block, the braking system comprising:
   a body;
   a braking linkage configured to act on at least one of the brakes;
   a service brake comprising a braking piston movable relative to the body to act on the braking linkage and delimiting a service brake pressure chamber with the body, the service brake pressure chamber configured to be supplied by a first pneumatic pressure agent to place the braking piston in a service braking position;
   a parking brake configured to act on the braking piston of the service brake and having a working configuration and a resting configuration, the parking brake comprising a blocking device movable relative to the body to act on the braking piston and having a first position and a second position in which the blocking device is configured to immobilize the braking piston in the service braking position with the parking brake in the working configuration;
   a control device movable relative to the body, the control device and the body configured to delimit a parking brake pressure chamber that is configured to be supplied by a second pneumatic pressure agent, the control device having a locking position in which the control device is configured to hold the blocking device in the second position; and
   a service brake indicator device configured to receive at least an item of information representing one or more of supply and/or venting of the service brake pressure chamber by the first pneumatic pressure agent,
   wherein the service brake indicator device comprises one or more of a first service contactor device connected to a first supply pipe of the service brake, a second service contactor device connected via a state pipe to a parking brake pipe, or a third service contactor device connected via the state pipe to the parking brake pipe,
   wherein the service brake indicator device comprises a fourth service contactor device which is connected to a service brake pipe and the first, second, and third service contactor devices, the second and third contactor devices connected to the first and fourth service contactor devices and to visual service indication devices of the indicator device,
   wherein one or more of the first, second, third, or fourth service contactor devices are formed by pressure switches or sensors,
   wherein
   (a) when the first service contactor device receives the item of information from a first supply pipe and the third service contactor device receives the item of information from the state pipe according to which there is no parking brake setting in the parking brake pipe, the service brake is in an engaged state and the visual service indication device is turned on; or
   (b) when the fourth service contactor device receives the item of information from the state pipe according to which there is a service brake setting in the service brake pipe and the third service contactor device receives the item of information from the state pipe according to which there is a parking brake setting in the parking brake constituting a setting for application of the parking brake, the service brake is in the engaged state and the visual service indication device is turned on.

2. The braking system of claim 1, wherein the braking system is configured to supply the service brake pressure chamber with a third pneumatic pressure agent of which a pressure value is determined, to apply a determined braking force when the parking brake is in the working configuration, and the service brake indicator device is configured to receive at least the item of information representing one or more of supply or venting of the service brake pressure chamber by the third pneumatic pressure agent.

3. The braking system of claim 1, further comprising:
   a relay device configured to generate, from the first pneumatic pressure agent, a pressure for use at a determined flowrate for filling of the service brake pressure chamber to place the braking piston in the service braking position, the relay device being connected to the service brake pressure chamber by a first supply pipe of the service brake.

4. The braking system of claim 3, wherein the service brake indicator device comprises at least one service contactor device connected via a state pipe to a service brake pipe located upstream of the relay device, the service brake indicator device configured to retrieve the item of information representing one or more of supply or venting of the service brake pressure chamber.

5. The braking system of claim 1, wherein:
   (c) when the first service contactor device receives the item of information from the first supply pipe according to which the first supply pipe does not supply the service brake pressure chamber and when the second service contactor device receives the item of information from the state pipe according to which there is no parking brake setting in the parking brake pipe, the service brake is in the disengaged state and the visual service indication device is turned on; or
   (d) when the fourth service contactor device receives the item of information from the state pipe according to which there is no service brake setting in the service brake pipe and the second service contactor device receives the item of information from the state pipe according to which there is a parking brake setting in the parking brake constituting a setting for application of the parking brake, the service brake is in the disengaged state and the visual service indication device is turned on.

6. The braking system of claim 1, wherein, when the first service contactor device receives the item of information from the first supply pipe according to which the first supply pipe supplies the service brake pressure chamber and when the fourth service contactor device receives the item of information from the state pipe according to which there is a service brake setting in the service brake pipe, the service brake is in the engaged state and the visual service indication device is turned on.

7. The braking system of claim 6, wherein, when the first service contactor device receives the item of information from the first supply pipe according to which the first supply pipe does not supply the pressure chamber of the service brake, the service brake is in the disengaged state and the visual service indication device is turned on; or when the first service contactor device receives the item of information from the first supply pipe according to which the first supply pipe supplies the service brake pressure chamber and when the fourth service contactor device receives the item of information from the state pipe according to which there is no service brake setting in the service brake pipe, the service brake is in the disengaged state and the visual service indication device is turned on.

8. A vehicle having brakes with at least one lining or with at least one block, the vehicle comprising at least one vehicle braking system according to claim 1, which is configured to act on the at least one lining or on the at least one block of the vehicle.

9. A braking system having brakes with at least one lining or at least one block, the braking system comprising:
   a body;
   a braking linkage configured to act on at least one of the brakes;
   a service brake comprising a braking piston movable relative to the body to act on the braking linkage and delimiting a service brake pressure chamber with the body, the service brake pressure chamber configured to be supplied by a first pneumatic pressure agent to place the braking piston in a service braking position;
   a parking brake configured to act on the braking piston of the service brake and having a working configuration and a resting configuration, the parking brake comprising a blocking device movable relative to the body to act on the braking piston and having a first position and a second position in which the blocking device is configured to immobilize the braking piston in the service braking position with the parking brake in the working configuration;
   a control device movable relative to the body, the control device and the body configured to delimit a parking brake pressure chamber that is configured to be supplied by a second pneumatic pressure agent, the control device having a locking position in which the control device is configured to hold the blocking device in the second position; and
   a service brake indicator device configured to receive at least an item of information representing one or more of supply and/or venting of the service brake pressure chamber by the first pneumatic pressure agent,
   wherein the service brake indicator device comprises one or more of a first service contactor device connected to a first supply pipe of the service brake, a second service contactor device connected via a state pipe to a parking brake pipe, or a third service contactor device connected via the state pipe to the parking brake pipe,
   wherein the service brake indicator device comprises a fourth service contactor device which is connected to a service brake pipe and the first, second, and third service contactor devices, the second and third contactor devices connected to the first and fourth service contactor devices and to visual service indication devices of the indicator device,
   wherein one or more of the first, second, third, or fourth service contactor devices are formed by pressure switches or sensors,
   wherein the second service contactor device is interposed between the first and fourth service contactor devices,
   wherein, when the first service contactor device receives the item of information from the first supply pipe according to which the first supply pipe supplies the service brake pressure chamber, the second service contactor device receives the item of information from the state pipe according to which there is a parking brake setting in the parking brake pipe constituting a setting for application of the parking brake, and the fourth service contactor device receives the item of information from the state pipe according to which there is a service brake setting in the service brake pipe, the service brake is in the engaged state and the service visual indication device is turned on; or when the first service contactor device receives the item of information from the first supply pipe according to which the first supply pipe supplies the service brake pressure chamber and when the second service contactor device receives the item of information from the state pipe according to which there is no parking brake setting in the parking brake pipe, the service brake is in the engaged state and the visual service indication device is turned on.

10. The braking system of claim 9, wherein, when the first service contactor device receives the item of information from the first supply pipe according to which the first supply pipe supplies the service brake pressure chamber, when the second service contactor device receives the item of information from the state pipe according to which there is a parking brake setting in the parking brake pipe constituting a setting for application of the parking brake, and when the fourth service contactor device receives the item of information from the state pipe according to which there is no service brake setting in the service brake pipe, the service brake is in the disengaged state and the service visual indication device is turned on; or when the first service contactor device receives the item of information from the first supply pipe according to which the first supply pipe does not supply the pressure chamber of the service brake, the service brake is in the disengaged state and the visual service indication device is turned on.

* * * * *